(12) United States Patent
Nagase et al.

(10) Patent No.: US 6,967,720 B2
(45) Date of Patent: Nov. 22, 2005

(54) MULTI-SCREEN SPECTROSCOPIC IMAGING DEVICE

(75) Inventors: Tomohiko Nagase, Tokyo (JP); Yoshio Oono, Tokyo (JP)

(73) Assignee: Kabushiki Kaisha Photron, Tokyo (JP)

( * ) Notice: Subject to any disclaimer, the term of this patent is extended or adjusted under 35 U.S.C. 154(b) by 120 days.

(21) Appl. No.: 10/469,234

(22) PCT Filed: Mar. 4, 2002

(86) PCT No.: PCT/JP02/01962

§ 371 (c)(1),
(2), (4) Date: Jan. 30, 2004

(87) PCT Pub. No.: WO02/071011

PCT Pub. Date: Sep. 12, 2002

(65) Prior Publication Data

US 2004/0120042 A1 Jun. 24, 2004

(30) Foreign Application Priority Data

Mar. 6, 2001 (JP) ............................. 2001-62300

(51) Int. Cl.$^7$ .............................................. G01J 3/51
(52) U.S. Cl. ...................................... 356/419; 250/226
(58) Field of Search ............................. 356/416, 419; 250/226

(56) References Cited

U.S. PATENT DOCUMENTS

| 5,717,605 A | 2/1998 | Komiya et al. |
| 6,070,018 A | 5/2000 | Matsushita .................. 396/225 |

FOREIGN PATENT DOCUMENTS

| JP | 51-104879 | 9/1976 |
| JP | 8-193884 | 7/1996 |
| JP | 10-54762 | 2/1998 |
| WO | 99/02950 | 1/1999 |

Primary Examiner—F. L. Evans
(74) Attorney, Agent, or Firm—Oblon, Spivak, McClelland, Maier & Neustadt, P.C.

(57) ABSTRACT

A split-screen spectroscopic imaging apparatus including a fiber optic plate having a light receiving end face on which the photogenic subject is primarily focused by an objective lens and a light emitting end face to which the primarily focused image is transmitted. Total reflection mirrors optically separate the optical path of the image from the light emitting end face into a plurality of optical paths. Coherent filters optically separate the images of the optical paths separated by the total reflection mirrors into images of a plurality of wavelength bands. A two-slop reflection rectangular prism synthesizes the images separated by the coherent filters into a single image by arranging them in a predetermined direction. A reducing optical system optically reduces the magnification of the image from the two-slop reflection rectangular prism. And, a CCD imaging element images the images from the reducing optical system substantially simultaneously by a single imaging face.

11 Claims, 5 Drawing Sheets

MULTI-SCREEN SPECTROSCOPIC IMAGING DEVICE

TECHNICAL FIELD

The present invention relates to a split-screen (or multi-split-screen) spectroscopic imaging apparatus, which receives light from a photogenic subject of an optional or desired phenomenon such as combustion to separate optically the light into a plurality of images having frequency bands and performs imaging of these images on a single display screen so that these images are simultaneously displayed on the single display screen, and especially relates to such a split-screen spectroscopic imaging apparatus that permits to avoid parallax and improve a monitor displaying accuracy.

BACKGROUND OF THE INVENTION

In combustion of fuel in an internal combustion engine, a blue flame, which is caused upon ignition by means of an ignition plug, usually converts into a red flame, which is caused upon combustion or the other colored flame. With respect to a measure to conduct analysis of a fuel combustion phenomenon in such an internal combustion engine, analysis of temperature of a chemical reaction or observation and analysis of behaviors or actions of a desired phenomenon, such as a bloodstream analysis utilizing a fluorescence microscope, there are conceivable measures to separate optically the light caused by such a phenomenon into a plurality of images having frequency bands for example of R, G and B (red, green and blue) so that these images are substantially simultaneously displayed on the single display screen.

These measures enable an operator to observe substantially simultaneously the respective image variation in R, G, and B on the single display screen to make a comparison. They are therefore considered to be effective in analysis of behaviors or actions of various kinds of phenomena.

In such measures, in case of a three-dimensional photogenic subject, the primary imaging of an image of the above-mentioned photogenic subject utilizing a field lens causes parallax in a depth direction in the primary imaging, with the result that accuracy in the imaging of the image based on the primary imaging and display thereof may be deteriorated, thus causing problems.

In a case where a half mirror, for applying a spectrographic step to the primary imaging caused by an objective lens so as to lead the light into a plurality of optical paths, is used to separate optically a transmitted light through the half mirror into a plurality of spectra having frequency bands, it is also conceivable that the amount of light for the transmitted image decreases upon transmission of the light through the half mirror, thus reducing the intensity of the light.

In an alternative case where a plurality of imaging elements perform imaging of a plurality of images, which have been optically separated into a plurality of frequency bands, respectively, to display them on a monitor, the images displayed on the monitor include discrepancies due to inherent characteristics in the respective imaging elements. It is therefore necessary to consider such discrepancies due to inherent characteristics in the imaging elements when conducting the image analysis, thus leading to an extremely complicated analysis and providing problems.

An object of the present invention, which was made in view of the above-described circumstances, is to provide a split-screen spectroscopic imaging apparatus that enables a single imaging element to perform a simultaneous imaging of a plurality of images into which the primary imaging of a photogenic subject having no or less parallax has been separated optically, at high accuracy and display these images on a monitor.

DISCLOSURE OF THE INVENTION

The present invention provides a split-screen spectroscopic imaging apparatus comprising: a primary imaging device having a light-receiving end surface on which an image of a photogenic subject is to be primarily focused through an objective lens and a light-emitting end surface to which a primary imaging focused on the light-receiving end surface is to be transmitted; a light path separating device for optically separating a light path of the image from the primary imaging device into a plurality of light paths; an image separating device for optically separating each of images in the respective light paths separated by the light path separating device into a plurality of images having frequency bands; an image synthesizing device for arranging the plurality of images, which have been separated by the image separating device, in predetermined directions to synthesize a single image; a reduction optical system for conducting an optical reduction of magnification of the image outputted from the image synthesizing device; and an imaging device for imaging the plurality of images outputted from the reduction optical system though a single imaging face.

According to the present invention, the image of the photogenic subject is primarily focused on the light-receiving end surface of the primary imaging device. As a result, even when the photogenic subject has a three-dimensional shape, what is focused on the light-receiving end surface is not the three-dimensional image, but the two-dimensional image, thus making it possible to avoid almost completely parallax, which is caused by the depth of the photogenic subject, in any viewing direction.

Such a two-dimensional image having substantially no parallax is separated into a plurality of images having frequency bands by means of the light path separating device and the image separating device, and the plurality of images are subjected to synthesis so as to be aligned in a predetermined direction(s) on a single display screen to conduct imaging through the single imaging face of the imaging device. In comparison with a case where the imaging of the plurality of images is conducted through separate imaging faces, there is therefore no need to consider discrepancies due to inherent characteristics in the respective imaging faces, when conducting the image analysis. It is therefore possible to improve analyzability and accuracy in a comparison/analysis process of the plurality of images.

The reduction optical system makes an appropriate adjustment of imaging magnification of the image of the photogenic subject in accordance with an imaging angle of the imaging face.

In the split-screen spectroscopic imaging apparatus of the present invention, the above-mentioned primary imaging device is preferably provided with a fiber-optic plate or a fiber-optic tapered body, which has the light-receiving end surface on which the image is to be primarily focused through the objective lens and the light-emitting end surface to which the primary imaging focused on the light-receiving end surface is to be transmitted, and the light-emitting end surface is preferably provided with a matte black mask having a predetermined shape, for surrounding a periphery of a displaying portion on which the primary imaging is to be displayed.

According to such features, the image of the photogenic subject is primarily focused on the light-receiving end surface of the fiber-optic plate or the fiber-optic tapered body through the objective lens, thus making it possible to provide the two-dimensional image having substantially no parallax due to the depth of the photogenic subject. The simultaneous imaging of the plurality of images based on such two-dimensional image having substantially no parallax is carried out, thus making it possible to improve the imaging accuracy or the displaying accuracy of the monitor.

The image, which has been primarily focused on the light-receiving end surface of the fiber-optic plate, is transmitted to the light-emitting end surface thereof, thus making it possible to improve the transmission accuracy.

In addition, the light-emitting end surface of the fiber-optic plate or the fiber-optic tapered body is covered, at the periphery of the light-emitting portion on which the primary imaging is to be emitted, with the matte black mask. As a result, there is kept a light-shield state in which the peripheries of the plurality of images at the frequency bands, into which the image is optically separated on the downstream side of the above-mentioned black mask, are surrounded with black frames. When the imaging of the plurality of images is conducted on the single imaging face or these images are displayed on the monitor, it is therefore possible to prevent or reduce the partial overlapping or interference of the adjacent images. In addition, it is possible to improve the contrast between the respective images and the black frames thereof. Definition of the images can therefore be improved in this manner.

In the split-screen spectroscopic imaging apparatus of the present invention, the above-mentioned light path separating device may preferably comprise a plurality of total reflection mirrors, which are disposed so as to be optically directed to the light-emitting end surface of the primary imaging device.

According to such a feature, the plurality of total reflection mirrors are disposed so as to be optically directed to the light-emitting end surface of the primary imaging device, to form a plurality of light paths without using a half mirror, thus making it possible to prevent the amount of light in these light paths to be reduced. In addition, an appropriate adjustment of the angles of reflection (i.e., the tilting angles) of the total reflection mirrors effectively and easily prevents the overlapping or interference of the plurality of images.

Further, in the split-screen spectroscopic imaging apparatus of the present invention, the above-mentioned light path separating device may preferably comprise one or more biprism for separating light emitted from the light-emitting end surface of the primary imaging device into the plurality of light paths.

According to such a feature, the light, which is emitted from the light-emitting end surface of the primary imaging device, can be separated optically into two light paths through the single piece of biprism, and use of the combination of two pieces of biprism enables the light to be separated into four light paths.

Further, in the split-screen spectroscopic imaging apparatus of the present invention, the above-mentioned image separating device may preferably comprise a plurality of interference filters, which are disposed respectively in the plurality of light paths to enable only the images at the predetermined frequency bands to transmit therethrough.

According to such a feature, it is possible to obtain easily the images at the plurality of frequency bands by a simple structure in which the interference filters for enabling only the images at the predetermined frequency bands to transmit therethrough, are disposed respectively in the plurality of light paths.

In the split-screen spectroscopic imaging apparatus of the present invention, the above-mentioned interference filters may preferably configured to permit transmission of light having colors of red, green and blue, and a combination color thereof.

According to such a feature, the above-mentioned interference filters is configured to permit transmission of light having colors of red, green and blue, and a combination color thereof, thus being convenient for a case where the apparatus is used for analysis of a phenomenon providing variation in color, such as analysis of combustion or temperature variation.

In addition, in the split-screen spectroscopic imaging apparatus of the present invention, the above-mentioned image synthesizing device may preferably comprise a right-angle prism with inclined surfaces, which receive the images at the respective frequency bands from the image separating device to subject the images to an optical synthesis so as to be aligned on a single plane and emit the light.

According to such a feature, the plurality of images at the frequency bands are subjected to the optical synthesis so as to be aligned on the single plane to form the single image through the right-angle prism with inclined surfaces, which is compact, lightweight, highly accurate and inexpensive. It is therefore possible to make the split-screen spectroscopic imaging apparatus compact, lightweight, highly accurate and inexpensive.

In addition, in the split-screen spectroscopic imaging apparatus of the present invention, the above-mentioned imaging device may preferably comprise a charge coupled device (CCD).

According to such a feature, the imaging device may be a camcorder (video camcorder) or a digital camera provided with a compact, lightweight, highly accurate and inexpensive charge coupled device. It is therefore possible to make the split-screen spectroscopic imaging apparatus compact, lightweight, highly accurate and inexpensive.

In the split-screen spectroscopic imaging apparatus of the present invention, the above-mentioned imaging device may preferably comprise a silver-salt photographic film.

According to such a feature, the imaging device may be a still camera provided with an inexpensive silver-salt photographic film, thus leading to a further reduced cost.

In the split-screen spectroscopic imaging apparatus according to the present invention, the above-mentioned imaging device may preferably be configured so that an imaging speed is controllable.

According to such a feature, the imaging speed of the imaging device for the photogenic subject is controllable. When there is carried out for example a high-speed imaging for a photogenic subject in which a phenomenon such as explosion with rapid variation takes place, such explosive phenomenon can be reproduced in slow motion, thus facilitating analysis of the photogenic subject.

The above-mentioned split-screen spectroscopic Imaging apparatus of the present invention may further comprise a monitor having a single screen on which the plurality of images focused by the imaging device are to be displayed.

According to such a feature, watching the single screen of the monitor enables behaviors of the plurality of images at the different frequency bands to be substantially simultaneously observed, thus improving analyzability and accuracy in a comparison/analysis process.

DESCRIPTION OF REFERENCE NUMERALS 1, 1a—split-screen (multi-split-screen) spectroscopic imaging apparatus, 2—photogenic subject, 3—objective lens, 4—fiber-optic plate, 4a—light-receiving end surface, 4b—light-emitting end surface, 5—two-dimensional image, 6a, 6b, 6c, 6d—total reflection mirror, 7a, 7b, 7c, 7d—light path, 8a, 8b, 8c, 8d—interference (coherent) filter, 9—single light path, 10—right-angle prism with two inclined surfaces, 11—imaging element, 11a—single imaging face, 12—reduction optical system, 13—display screen, 14a, 14b, 14c, 14d—image, 15—light-shielded portion, 16—overlapping portion, 21—biprism, 21a, 21b—inclined surface, 21c—ridgeline

BEST MODE FOR CARRYING OUT THE INVENTION

Now, embodiments of the present invention will be described below with reference to FIGS. 1 to 6. In these figures, the same reference numerals are allotted to the same or corresponding structural components.

Figure 1:
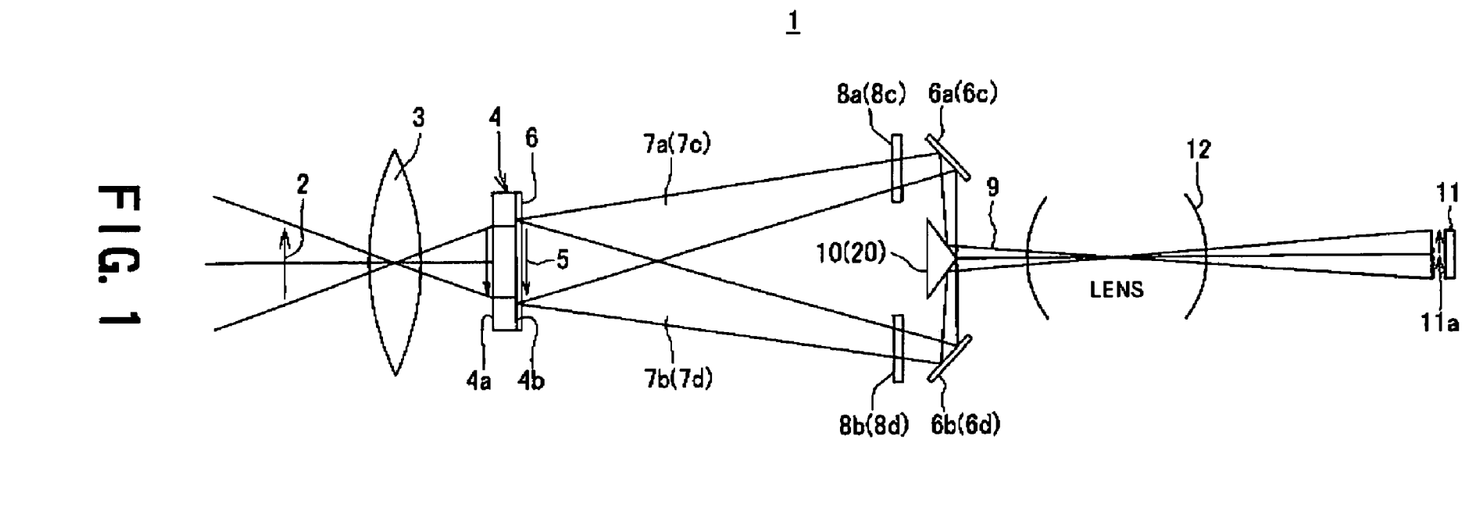
FIG. 1 is a schematic descriptive view illustrating the whole structure of a split-screen spectroscopic imaging apparatus according to the first embodiment of the present invention.

FIG. 1 is a schematic descriptive view illustrating the whole structure of a split-screen (or multi-split-screen) spectroscopic imaging apparatus 1 according to the first embodiment of the present invention. The split-screen spectroscopic imaging apparatus 1 is provided with an objective lens 3, which is disposed so as to be optically directed to a photogenic subject 2, and a fiber-optic plate 4 having a light-receiving end surface 4a on which an image of the photogenic subject 2 is to be primarily focused through the above-mentioned objective lens 3, and a light-emitting end surface 4b to which the primary imaging from the light-receiving end surface 4a to be transmitted. The fiber-optic plate 4 and the objective lens 3 form a primary imaging device. Even in case where the photogenic subject 2 is solid (i.e., has a three-dimensional shape), the image of the photogenic subject 2 is primarily focused on the light-receiving end surface 4a of the fiber-optic plate 4, thus providing, as the primary imaging, the two-dimensional image having substantially no parallax, which is caused by the depth of the photogenic subject 2.

The above-mentioned fiber-optic plate 4, which is an optical device in which tens of thousands of optical fibers having a small diameter for example of Gym are tied into a bundle, has a function of transmitting an image from the light-receiving end surface 4a to the light-emitting end surface 4b with a high degree of accuracy. The above-mentioned fiber-optic plate 4 may be substituted by a fiber-optic tapered body, which is provided with the light-emitting end surface 4b having the smaller diameter than the light-receiving end surface 4a.

Figure 2:
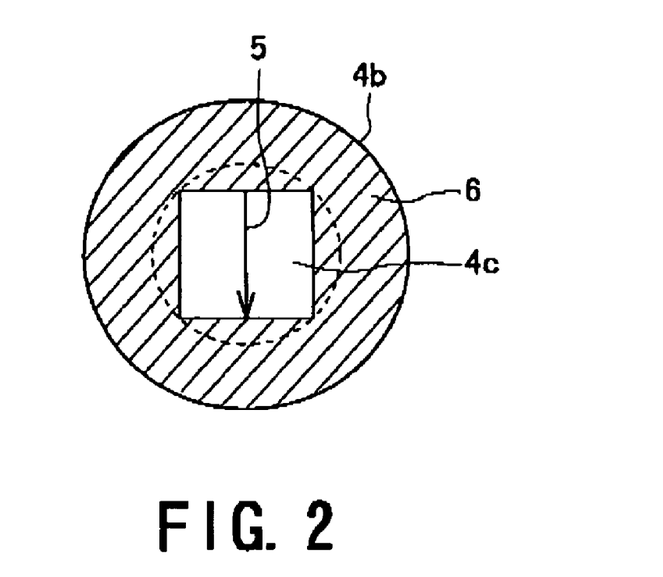
FIG. 2 is a front view of the light-emitting end surface of a fiber-optic plate as shown in FIG. 1.

In FIG. 2, a matte black coating is applied on the light-emitting end surface 4b of the fiber-optic plate 4 so as to surround a displaying portion 4c on which the two-dimensional image 5 is to be displayed, with a predetermined shape such as a quadrangular or circular shape, to form a black mask 6.

A plurality of total reflection mirrors, for example two mirrors. i.e., the upper and lower mirrors 6a, 6b as shown in FIG. 1 are disposed on the downstream side of the light-emitting end surface 4b of the fiber-optic plate 4 relative to the light traveling direction to form two light paths 7a, 7b through which the two-dimensional image is optically transmitted. A light path separating device is formed in this manner.

A plurality of interference (coherent) filters, for example two interference filters 8a. 8b, which enable only light having two frequency bands to transmit therethrough, respectively, are disposed in the above-mentioned light paths 7a, 7b, respectively. An image separating device is formed in this manner.

In addition, there is formed an image synthesizing (or composing or combining) device in which the respective lights reflected from the two total reflection mirrors 6a, 6b are caused to be launched into two inclined surfaces of a right-angle prism 10 having a triangle pole shape to synthesize (compose or combine) a single image so that the plurality of images with the frequency bands, which are included in the reflected lights, are aligned in a predetermined direction, for example the vertical direction, on a single plane, and emit the light in the single light path 9. The single image, which has been launched into the above-mentioned light path 9, is focused on the single imaging face 11a of an imaging element 11, i.e. a CCD (charge coupled device) through a reduction optical system 12. The reduction optical system 12 has an imaging magnification, which is appropriately adjustable in accordance with an imaging angle of the imaging face 11a so that the entire image as synthesized can be focused completely on the single CCD imaging face 11a.

Such a CCD imaging element 11 is mounted on a monitor, not-shown. The images 14a, 14b having the frequency bands are substantially simultaneously displayed on the single display screen 13 in the form of two-dimensional image having substantially no parallax, so as to be aligned with a small distance left therebetween in a predetermined direction, for example, the vertical direction, as shown in FIG. 3(A). A hatched portion on the display screen 13 in FIG. 3(A) is alight-shielded portion is for ensuring a light-shielded condition through the black mask 6 of the above-mentioned fiber-optic plate 4, so as to prevent the overlapping or interference (coherence) of the plurality of images 14a, 14b.

More specifically, in a case where such a black mask 6 does not exist and there exists an overlapping portion 16 in which the plurality of images 14a, 14b are overlapped as shown in small circles in FIG. 3(B), interference of the images 14a, 14b occurs in the overlapped portion 16, thus leading to distortion of these images 14a, 14b and color interference. The embodiment of the present invention in which the fiber-optic plate 4 is provided on the light-emitting end surface 4b thereof with the black mask 6, can prevent the occurrence of the above-mentioned distortion.

The above-mentioned imaging element 11 is configured so as to be capable of controlling appropriately the imaging speed utilizing the imaging face 11a. The imaging speed is appropriately controllable so as to provide a high-speed imaging, which enables reproduction of a phenomenon such as an explosive phenomenon in slow motion.

According to the split-screen spectroscopic imaging apparatus of the present invention, the three-dimensional image of the phenomenon such as an explosive phenomenon or a solid of a photogenic subject 2 is primarily focused on the light-receiving end surface 4b of the fiber-optic plate 4 through the objective lens 3 and then transmitted to the light-emitting end surface 4b. Accordingly, the two-dimensional image 5, which has substantially no parallax, is emitted from the light-emitting end surface 4b.

The two-dimensional image 5 thus emitted is optically separated into the two light paths 7a, 7b through the two total reflection mirrors 6a. 6b, respectively, and then optically separated into the images having two frequency bands through the two interference filters 8a, 8b, which are provided in the above-mentioned two light paths 7a, 7b, respectively. Disposing these total reflection mirrors 6a, 6b on the vertical line as shown in FIG. 1 enables the two light paths 7a, 7b to be separated in the vertical direction to align the images 14a, 14b in the vertical direction as shown in FIG. 3(A).

These two images are reflected by the total reflection mirrors 6a, 6b and then launched into the two inclined surfaces of the right-angle prism 10. Here, there is provided a synthesized image on the single screen so that the plurality of images 14a, 14b are aligned for example in the vertical direction on the above-mentioned single screen. The thus synthesized image is launched into the single light path 9 and then reduced at a predetermined reduction magnification through the reduction optical system 12, and finally the imaging thereof is carried out through the single imaging face 11a of the not-shown monitor.

The image, which is provided by the imaging face 11a, is displayed on the single display screen 13 of the monitor in a state in which the two images 14a, 14b in the form of the two-dimensional image are aligned for example in the vertical direction as shown in FIG. 3(A).

According to the split-screen spectroscopic imaging apparatus of the present invention, the image of the photogenic subject 2 is primarily focused on the light-receiving end surface 4a of the fiber-optic plate 4. As a result, even when the photogenic subject has a three-dimensional shape, what is focused on the light-receiving end surface 4a is not the three-dimensional image, but the two-dimensional image 5, thus making it possible to avoid almost completely parallax in any viewing direction.

Such a two-dimensional image having substantially no parallax is separated into the plurality of images having frequency bands, and the plurality of images are subjected to synthesis to form the single synthesized image so as to conduct imaging through the single imaging face 11a. In comparison with a case where the imaging of the plurality of images is conducted through separate imaging faces, there is therefore no need to consider discrepancies due to inherent characteristics in the respective imaging faces, when conducting the image analysis. It is therefore possible to improve analyzability and accuracy in a comparison/analysis process of the plurality of images 14a, 14b.

The reduction optical system 12 makes an appropriate adjustment of imaging magnification of the image of the photogenic subject 2 in accordance with an imaging angle of the imaging face 11a.

In addition, the light-emitting end surface 4b of the fiber-optic plate 4 or the fiber-optic tapered body is covered, at the periphery of the light-emitting portion on which the primary imaging is to be emitted, with the black mask 6. As a result, there is kept a light-shield state in which the peripheries of the plurality of images 14a, 14b at the frequency bands into which the image is optically separated on the downstream side of the above-mentioned black mask are surrounded with black frames. When the imaging of the plurality of images 14a. 14b is conducted on the single imaging face or these images 14a, 14b are displayed on the monitor, it is therefore possible to prevent or reduce the partial overlapping or interference of the adjacent images 14a, 14b. In addition, it is possible to improve the contrast between the respective images 14a, 14b and the black frames thereof. Definition of the display screen 13 can therefore be improved in this manner.

In addition, the plurality of total reflection mirrors 6a, 6b are disposed so as to be optically directed to the light-emitting end surface 4b, to form a plurality of light paths 7a, 7b without using a half mirror, thus making it possible to prevent the amount of light in these light paths 7a, 7b to be reduced. In addition, an appropriate adjustment of the angles of reflection (i.e., the tilting angles) of the total reflection mirrors 6a, 6b effectively and easily prevents the overlapping or interference of the plurality of images 14a, 14b.

The above-mentioned split-screen spectroscopic imaging apparatus 1 is described in a case where the light emitted from the two-dimensional image 5 on the light-emitting end surface 4b of the fiber-optic plate 4 is optically separated into the two light paths 7a, 7b to produce the two separated images 14a, 14b. The present invention is not limited only to such a case. For example, two additional light paths 7c, 7d may be added to the above-mentioned two light paths 7a, 7b to form the four light paths 7a to 7d.

Figure 4A:
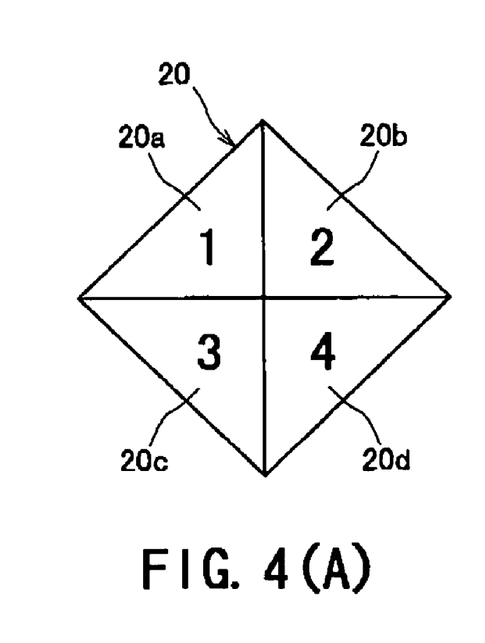
FIG. 4(A) is a front view of a right-angle prism with inclined surfaces, which is a modification of the right-angle prism with two inclined surfaces as shown in FIG. 1.

In this case, the above-mentioned right-angle prism 10 having two inclined surfaces is substituted with another right-angle prism 20 having four inclined surfaces 20a, 20b, 20c, 20d, as shown in FIG. 4(A), and the additional two reflection mirrors 6c, 6d are added to the above-mentioned two reflection mirrors 6a, 6b to form the four total reflection mirrors 6a, 6b, 6c, 6d. These total reflection mirrors 6a, 6b, 6c, 6d are disposed at predetermined intervals so as to be optically directed to the light-emitting end surface 4b of the fiber-optic plate 4, thus forming the four light paths 7a, 7b, 7c, 7d. In addition, four interference filters 8a, 8b, 8c, 8d, which permit to separate optically the two-dimensional image 5 into images having frequency bands for example of R (red), G (green), B (blue) and a combination color thereof, are disposed in the above-mentioned four light paths 7a, 7b, 7c, 7d. The above-mentioned structure is provided so that lights reflected from the respective total reflection mirrors Ga to 6d are launched into the respective inclined surfaces 20a, 20b, 20c, 20d of the right-angle prism 20 and the resultant synthesized light is launched into the single light path 9. The other structure than the matters described above is the same as that of the split-screen spectroscopic imaging apparatus according to the first embodiment of the present invention.

Figure 3:
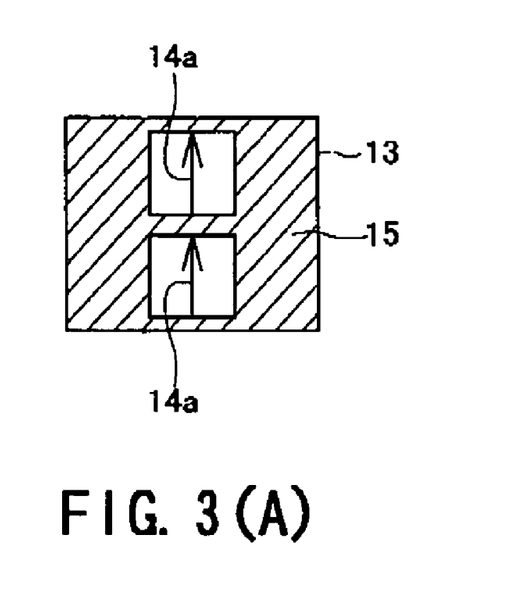
FIG. 3(A) is a schematic descriptive view illustrating an example in which an image of a photogenic subject is displayed on the single imaging face of a monitor on which an imaging element as shown in FIG. 1 is mounted.
FIG. 3(B) is a schematic descriptive view illustrating interference of two images as shown In FIG. (A), with two small circles.
Figure 4B:
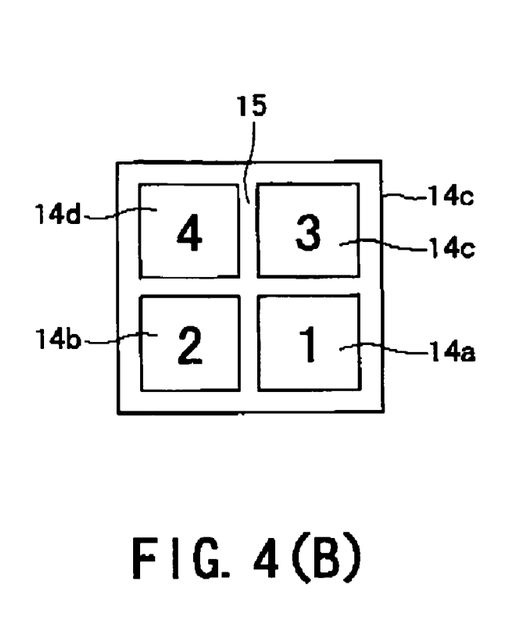
FIG. 4(B) is a schematic descriptive view illustrating a display example in which four images are displayed on the single display screen utilizing the right-angle prism with inclined surfaces as shown in FIG. 4(A)

FIG. 4(B) shows a state in which four images 14a to 14d for example of R, G. B and a combination color thereof are substantially simultaneously displayed at the predetermined intervals on the single display screen 13 of the monitor of the split-screen spectroscopic imaging apparatus 1 having the above-described structure. In this case, the four images 14a to 14d for example of R, G. B and the combination color thereof are substantially simultaneously displayed on the single display screen 13, thus being convenient for a case where the apparatus is used for analysis and observation of a phenomenon in which temperature variation causes variation in color, for example, as in a combustion phenomenon in an internal combustion engine, in which the color of a flame is turned from blue upon ignition to red upon combustion. The reference numeral "15" in FIG. 4(B) shows a light-shielded portion for ensuring a light-shielded condition through the above-described black mask 6 as in the reference numeral "15" in FIG. 3(A).

Figure 5:
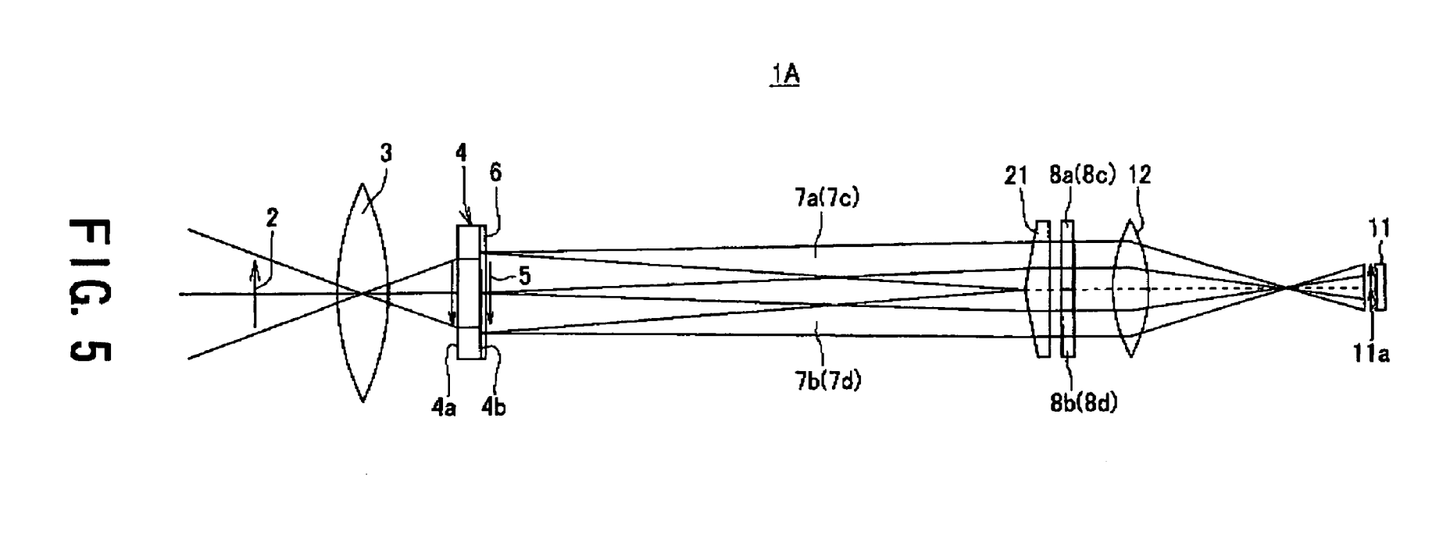
FIG. 5 is a schematic descriptive view illustrating the whole structure of the split-screen spectroscopic imaging apparatus according to the second embodiment of the present invention.

FIG. 5 is a schematic descriptive view illustrating the whole structure of the split-screen (or multi-split-screen) spectroscopic imaging apparatus 1A according to the second embodiment of the present invention. The split-screen spectroscopic imaging apparatus 1A is characterized in that the two total reflection mirrors 6a, 6b in the split-screen spectroscopic imaging apparatus 1 according to the first embodiment of the present invention as shown in FIG. 1, are substituted with a single biprism 21 and two interference filters 8a, 8b are disposed respectively in two light paths 7a, 7b on the light-emitting end surface side of the biprism 21 so as to be aligned in the vertical direction in FIG. 5

Figure 6:
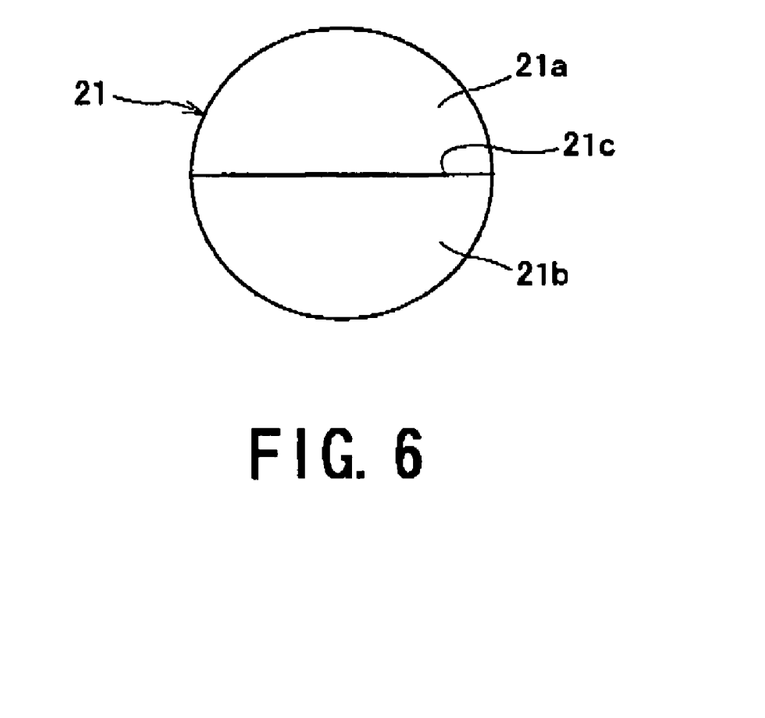
FIG. 6 is a front view of a biprism as shown in FIG. 5.

As shown in FIG. 6, the biprism 21 is provided with the upper and lower half portions having two inclined surfaces 21a, 21b, respectively. Light emitted from the light-emitting end surface 4b of the above-mentioned fiber-optic plate 4 is launched directly into the above-mentioned two inclined surfaces 21a, 21b so as to be optically separated into two light paths 7a, 7b. As a result, the lights in these two light paths 7a, 7b are optically separated into two images having frequency bands through the respective interference filters 8a, 8b. These two images are combined into a single synthesized image in a state in which they are aligned for example in the vertical direction. The resultant image as synthesized is then reduced at a predetermined reduction magnification by means of the reduction optical system 12 and the imaging thereof is carried out on the single imaging face 11a of the imaging element 11. Accordingly, the plurality of images 14a, 14b are displayed, as shown in FIG. 3, on the display screen 13 so as to be aligned in the vertical direction in FIG. 3. An alignment direction of these images 14a, 14b is determined in accordance with an alignment direction of the two inclined surfaces 21a, 21b of the biprism 21.

The above-mentioned split-screen spectroscopic imaging apparatus 1A is described in a case where the light emitted from the fiber-optic plate 4 is optically separated into the two light paths 7a, 7b. The present invention is not limited only to such a case. For example, two additional light paths 7c, 7d may be added to the above-mentioned two light paths 7a, 7b to form the four light paths 7a to 7d.

In this case, the second biprism 21 is disposed on the front or rear side of the biprism 21 as shown in FIG. 6 so as to be coaxially therewith in a state in which the ridgeline 21c of the former intersects the ridgeline 21c of the latter at right angles, to form the four inclined surfaces 21a, 21a, 21b, 21b.

As a result, the four light paths 7a, 7b, 7c, 7d into which the lights are to be launched from the fiber-optic plate 4, are formed in correspondence to the above-mentioned four inclined surfaces 21a, 21a, 21b, 21b, respectively. Interference filters 8a, 8b, 8c, 8d, which enable only the light having for example the predetermined four frequency bands (i.e., R, G, B, etc.) to transmit therethrough, are disposed in these four light paths 7a, 7b, 7c, 7d, respectively.

Figure 7:
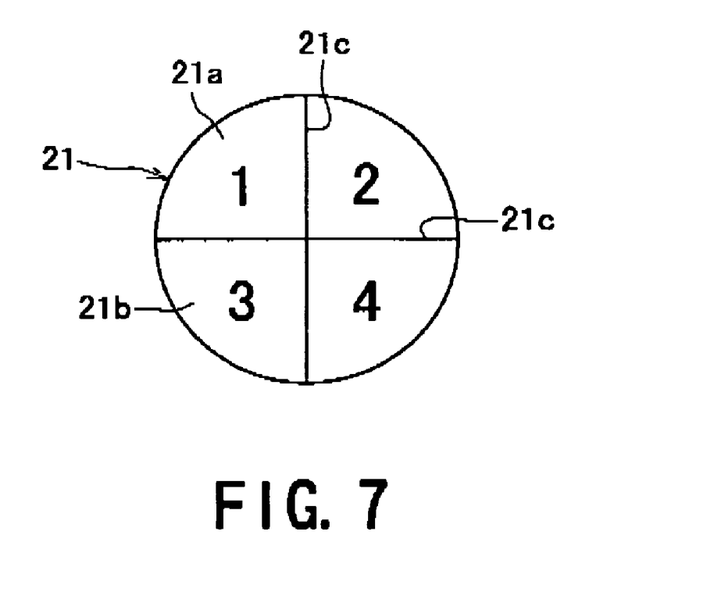
FIG. 7 is a view illustrating, in case where two pieces of biprism as shown in FIG. 6 are disposed in the optical axis of the optical system, the positional relationship of four inclined surfaces of them.

According to the above-described structure, the imaging of the four images 14a to 14d into which the image has been optically separated through the four interference filters 8a to 8d, is conducted on the single imaging face 11a of the imaging element 11, with the result that these four images 14a to 14d are substantially simultaneously displayed on the single display screen 13 of the monitor, as shown in FIG. 4(B). The bold numerals "1 to 4" in FIG. 4(B) correspond to the bold numerals "1 to 4", which is indicative of the positional relationship among the four inclined surfaces 21a to 21b of the biprisms 21 as shown in FIG. 7, respectively. The image, which has been launched into the inclined surface having the reference numeral "1" of the biprism 21 as shown in FIG. 7 is for example displayed in a position having the same reference numeral "1" on the display screen 13 as shown in FIG. 4(B).

INDUSTRIAL APPLICABILITY

According to the present invention as described above, the image of the photogenic subject is primarily focused on the light-receiving end surface of the primary imaging device. As a result, even when the photogenic subject has a three-dimensional shape, what is focused on the light-receiving end surface is not the three-dimensional image, but the two-dimensional image, thus making it possible to avoid almost completely parallax, which is caused by the depth of the photogenic subject, in any viewing direction.

Such a two-dimensional image having substantially no parallax is separated into a plurality of images having frequency bands by means of the light path separating device and the image separating device, and the plurality of images are subjected to synthesis so as to be aligned in a predetermined directions on the single display screen to conduct imaging through the single imaging face of the imaging device. In comparison with a case where the imaging of the plurality of images is conducted through separate imaging faces, there is therefore no need to consider discrepancies due to the inherent characteristics in the respective imaging faces, when conducting the image analysis. It is therefore possible to improve analyzability and accuracy in a comparison/analysis process of the plurality of images.

In addition, an appropriate adjustment of imaging magnification of the image of the photogenic subject in accordance with an imaging angle of the imaging face is made by means of the reduction optical system.

What is claimed is:

1. A split-screen spectroscopic imaging apparatus comprising:

a primary imaging device having a light-receiving end surface on which an image of a photogenic subject is to be primarily focused through an objective lens, and a light-emitting end surface to which a primary imaging focused on the light-receiving end surface is to be transmitted;

a light path separating device for optically separating a light path of the image from the primary imaging device into a plurality of light paths;

an image separating device for optically separating each of images in each of the respective light paths separated by the light path separating device into a plurality of images having frequency bands;

an image synthesizing device for arranging the plurality of images, which have been separated by the image separating device, in predetermined directions to synthesize a single image;

a reduction optical system for conducting an optical reduction of magnification of the image outputted from the image synthesizing device; and an imaging device for imaging the plurality of images outputted from the reduction optical system though a single imaging face.

2. A split-screen spectroscopic imaging apparatus according to claim 1, wherein said primary imaging device is provided with a fiber-optic plate or a fiber-optic tapered body, which has the light-receiving end surface on which the image is to be primarily focused through the objective lens, and the light-emitting end surface to which the primary imaging focused on the light-receiving end surface is to be transmitted, said light-emitting end surface being provided with a matte black mask having a predetermined shape, for surrounding a periphery of a displaying portion on which the primary imaging is to be displayed.

3. A split-screen spectroscopic imaging apparatus according to claim 1, wherein said light path separating device comprises a plurality of total reflection mirrors, which are disposed so as to be optically directed to the light-emitting end surface of the primary imaging device.

4. A split-screen spectroscopic imaging apparatus according to claim 1, wherein said light path separating device comprises one or more biprisms for separating light emitted from the light-emitting end surface of said primary imaging device into the plurality of light paths.

5. A split-screen spectroscopic imaging apparatus according to claim 1, wherein said image separating device comprises a plurality of interference filters, which are disposed respectively in the plurality of light paths to enable only the images at the predetermined frequency bands to transmit therethrough.

6. A split-screen spectroscopic imaging apparatus according to claim 5, wherein said interference filters are configured to permit transmission of light having colors of red, green and blue, and a combination color thereof.

7. A split-screen spectroscopic imaging apparatus according to claim 1, wherein said image synthesizing device comprises a right-angle prism with inclined surfaces, which receive the images at the respective frequency bands from the image separating device to subject the images to an optical synthesis so as to be aligned on a single plane and emit the light.

8. A split-screen spectroscopic imaging apparatus according to claim 1, wherein said imaging device comprises a charge coupled device.

9. A split-screen spectroscopic imaging apparatus according to claim 1, wherein said imaging device comprises a silver-salt photographic film.

10. A split-screen spectroscopic imaging apparatus according to claim 1, wherein said imaging device is configured so that an imaging speed is controllable.

11. A split-screen spectroscopic imaging apparatus according to claim 1, further comprising a monitor having a single screen on which the plurality of images focused by the imaging device are to be displayed.

* * * * *